US006339190B1

(12) United States Patent

Chung

(10) Patent No.: US 6,339,190 B1

(45) Date of Patent: Jan. 15, 2002

(54) SIGNAL DISTRIBUTOR

(75) Inventor: Jui-Huang Chung, Taipei (TW)

(73) Assignee: Signal CATV System Inc., Hsien Roc (TW)

( * ) Notice: Subject to any disclaimer, the term of this patent is extended or adjusted under 35 U.S.C. 154(b) by 0 days.

(21) Appl. No.: 09/669,148

(22) Filed: Sep. 25, 2000

(51) Int. Cl.[7] .................................................. H02G 3/08

(52) U.S. Cl. .......................................... 174/50; 439/811

(58) Field of Search ............................ 174/50, 51, 135, 174/40 CC, 17 R, 65 R, 65 G; 439/810, 811, 812, 813, 814, 815, 801

(56) References Cited

U.S. PATENT DOCUMENTS 2,068,152 A * 1/1937 Rowe .......................... 439/811
2,201,674 A * 5/1940 Rowe et al. ................ 439/812
2,222,156 A * 11/1940 Rowe .......................... 439/812
3,551,876 A * 12/1970 Walter ........................ 439/810
3,727,171 A * 4/1973 Coles et al. ................ 439/811
3,864,005 A * 2/1975 Klein .......................... 439/811
4,072,393 A * 2/1978 McDermott et al. ........ 439/810
4,213,669 A * 7/1980 Wittes et al. ............... 439/811
5,000,705 A * 3/1991 Kinka et al. ................ 439/811
5,533,913 A * 7/1996 Boehm et al. .............. 439/810
5,750,929 A * 5/1998 Romerein et al. .......... 439/811
5,957,733 A * 9/1999 Mello et al. ................ 439/810
6,011,218 A * 1/2000 Burek et al. .................. 174/51
6,186,839 B1 * 2/2001 Storey et al. ............... 439/812

* cited by examiner

*Primary Examiner*—Anthony Dinkins
*Assistant Examiner*—Angel R. Estrada
(74) *Attorney, Agent, or Firm*—Graybeal Jackson Haley LLP

(57) ABSTRACT

A signal distributor includes a main body, a screw and a clamp attached to the screw. The main body has a ground outlet formed with a threaded hole, an orifice laterally extending through the threaded hole, and a pair of grooves axially and diametrically defined in an inner periphery of the threaded hole. The screw has a head, a threaded shank engagable with the threaded hole and a flanged neck formed between the head and the threaded shank. The clamp has a strip deformable to be held in the flanged neck, two extensions extending downwardly from an under face of the strip and movable in the groove, and a contact connected to distal ends of the extensions. The contact defines a substantially V-shaped slot in an under face thereof to engage a ground wire to be held in the orifice.

3 Claims, 4 Drawing Sheets

SIGNAL DISTRIBUTOR

BACKGROUND OF THE INVENTION

1. Field of the Invention

The present invention relates to a signal distributor and, more particularly, to an improved signal distributor which can be grounded in a corrosion-minimized manner.

2. Description of Related Art

It is necessary for a signal distributor to be grounded, in order to electrically shield signals transmitted through it. As shown in FIG. 5, such a distributor typically includes a main body (50) having a ground outlet (52), with a threaded hole (not numbered) defined in the outlet (52), and an orifice (54) laterally extending through the threaded hole for receiving a ground wire (70).

The ground wire (70) is held in place by a screw (60). Being engaged with the threaded hole of the ground outlet (52), the screw (60) presses the wire (70) against the main body (50) at the bottom of the threaded hole. However, the resulting pressure will cause significant deformation and often oxidation of the wire (70), resulting in poor electric connection between the screw (60) and the ground wire (70).

A signal distributor that is provided with a contact pad attached to a bottom of a screw has been developed. Here, it is the contact pad that directly presses a ground wire. Although the provision provides a large area between the engaged wire and the pad, the related screw has a non-standard configuration which needs to be made specially. Furthermore, it is inconvenient to fit the small pad in the assembly of the distributor.

Therefore, it is an objective of the invention to provide an improved signal distributor to mitigate and/or obviate the aforementioned problems.

SUMMARY OF THE INVENTION

The object of the present invention is to provide a signal distributor which can be grounded in a corrosion-minimized manner.

Another object of the present invention is to provide a signal distributor which is easily manufactured.

Still another object of the present invention is to provide a signal distributor which is conveniently assembled.

Other objects, advantages and novel features of the invention will become more apparent from the following detailed description when taken in conjunction with the accompanying drawings.

DETAILED DESCRIPTION OF THE PREFERRED EMBODIMENT

Figure 1:
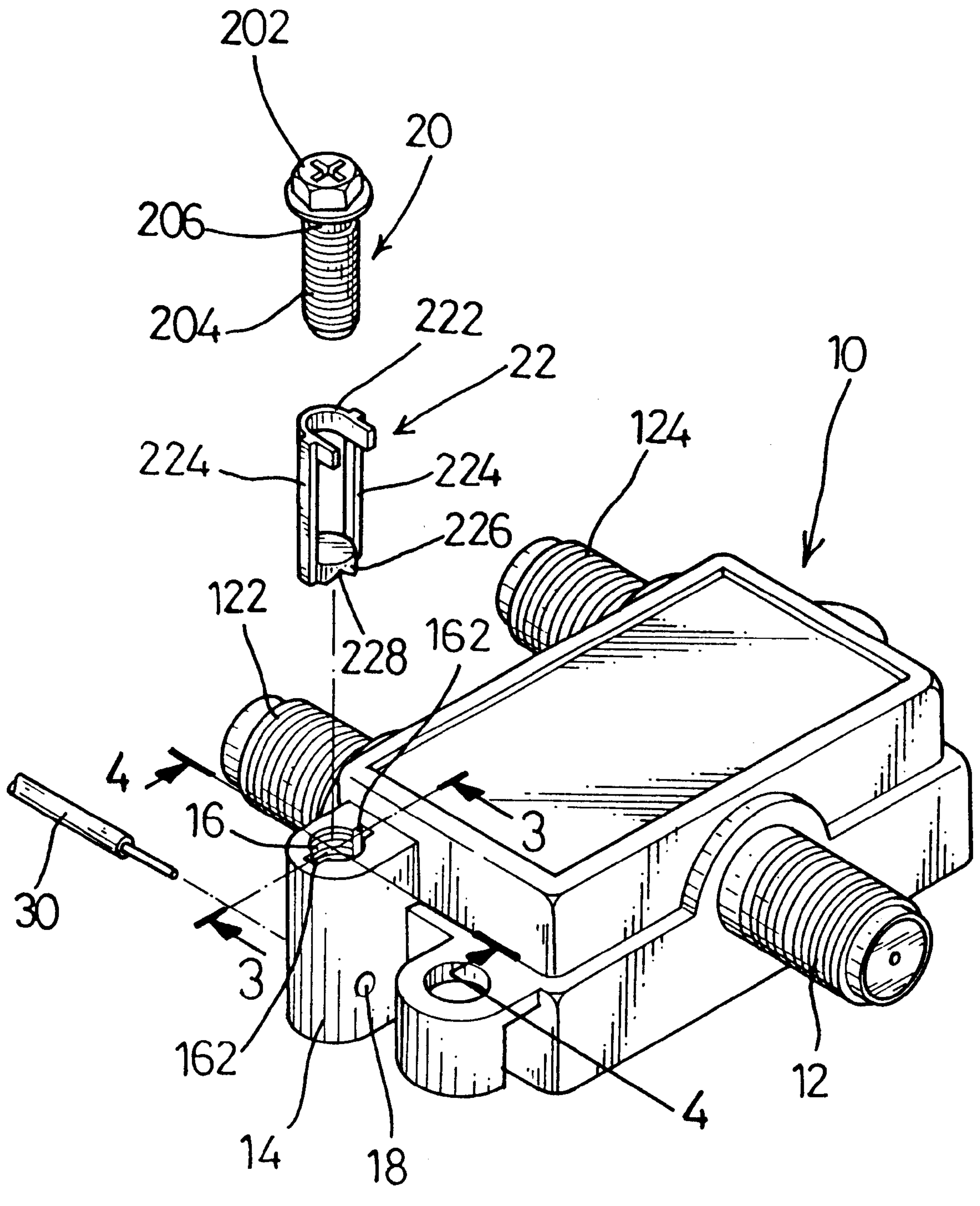
FIG. 1 is an exploded perspective view of a preferred embodiment of a signal distributor in accordance with the present invention.

FIG. 1 shows a preferred embodiment of an improved signal distributor in accordance with the present invention. In this embodiment, the distributor includes a main body (10) having a signal inlet (12), a pair of signal outlets (122, 124) and a ground outlet (14).

The ground outlet (14) is formed with a threaded hole (16), an orifice (18) laterally extending through the hole (16) for receiving a ground wire (30), and a pair of grooves (162) axially and diametrically defined in an inner periphery of the threaded hole (16).

A screw (20) is provided for securely holding the ground wire (30) in the orifice (18) of the ground outlet (14). The screw, which is a commercially-available standard one, includes a head (202), a threaded shank (204) engagable with the threaded hole (16), and a flanged neck (206) formed between the head (202) and the threaded shank (204).

Between the screw (20) and the ground wire (30), there is a clamp (22) that ultimately urges against the ground wire (30) as the screw (20) turns inward. In the illustrated embodiment, the clamp (22) has a U-shaped strip (222) deformable to be held around the flanged neck (206) of the screw (20), a pair of extensions (224) extending downwardly from an under face of the strip (222) and receivable in the grooves (162), and a contact (226) connected to distal ends of the extensions (224). Additionally, the contact (226) defines a substantially V-shaped slot (228) defined in an under face thereof. The extensions (224) must have a length slightly longer than that of the threaded shank (204) of the screw (20), so that the contact (226) may not interfere with an end of the shank (204), as best shown in FIGS. 3 and 4.

Figure 2:
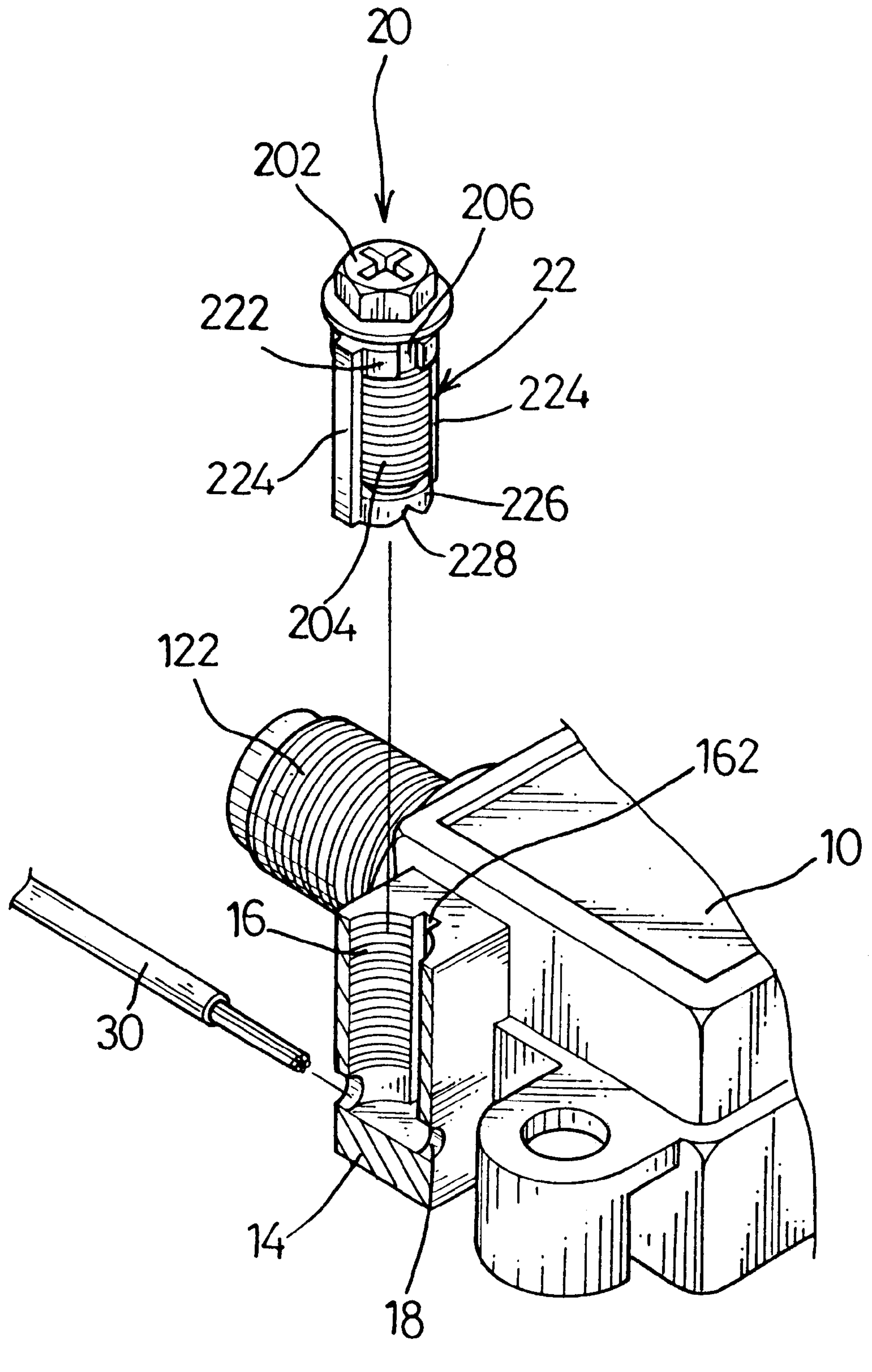
FIG. 2 is a fragmentary perspective view, partially cut away, of the signal distributor shown in FIG. 1.

Referring to FIG. 2, the clamp (22) is attached to the screw (20) once the strip (222) is deformed and retained in the flanged neck (206) of the screw (20). As a result, the screw (20) is rotatable but not movable relative to the piece (22).

Figure 3:
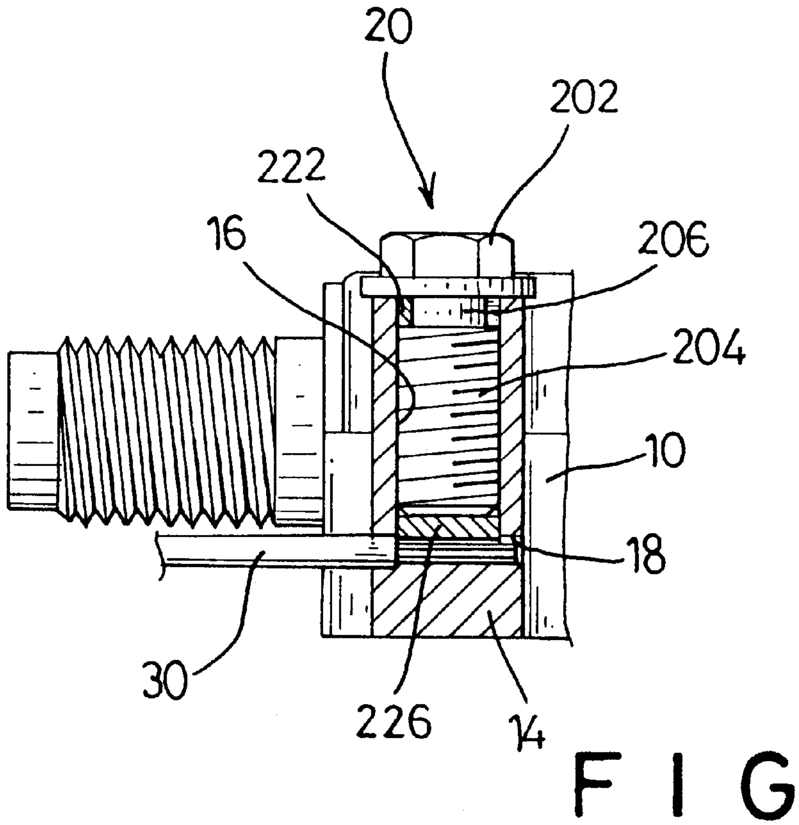
FIG. 3 is a fragmentary cross-sectional side view of the signal distributor shown in FIG. 1.
Figure 4:
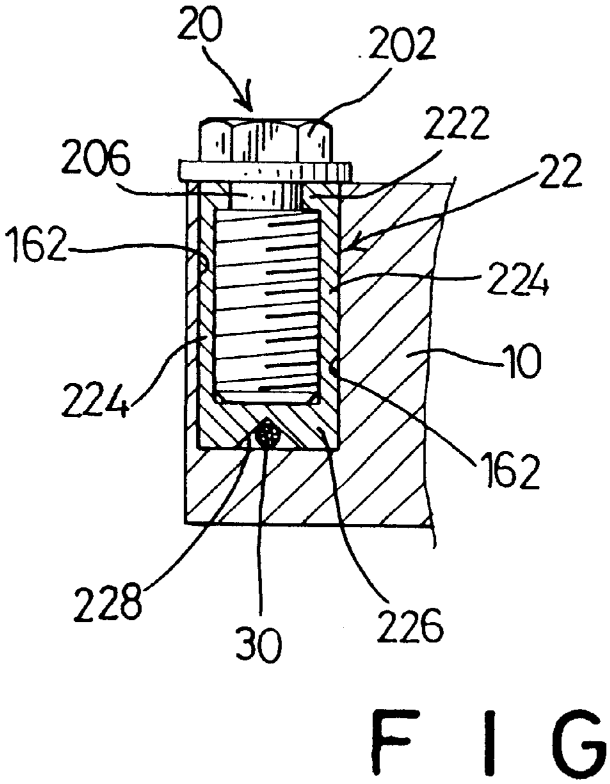
FIG. 4 is a fragmentary cross-sectional front view of the signal distributor shown in FIG. 1.
Figure 5:
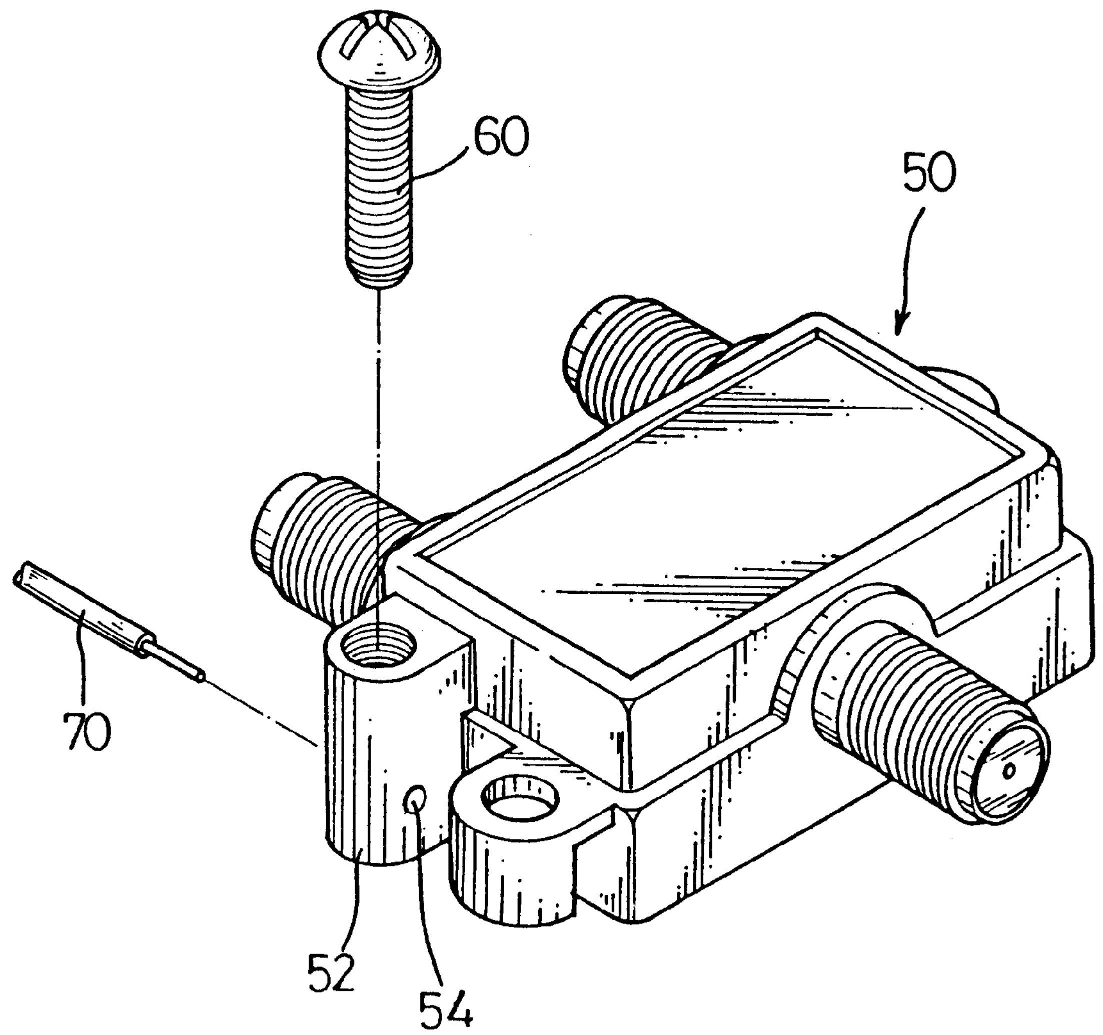
FIG. 5 PRIOR ART
FIG. 5 is an exploded perspective view of a conventional signal distributor.

Referring to FIGS. 3 and 4, the screw (20) is then engaged with the threaded hole (16), with the extensions (224) of the clamp (22) being respectively received in the grooves (162) of the ground outlet (14). As the screw (20) is screwed deeper and deeper into the main body (10), the clamp (22) mounted on the screw (20) is moved downward until its contact (226) engages the ground wire (30), which, at this time, is retained in the slot (228) and securely held in the orifice (18).

As can be seen in FIG. 4, the slot (228) allows the contact (226) to engage the ground wire (30) at two points rather than one. For a given friction necessary for holding the ground wire (30) in the orifice (18), the increased number of points reduces the pressure required at each of the two points, as well as at a related point between the wire (30) and the main body (10). Thus, the pressure at each of the three points may be reduced. This lessens the deformation of the ground wire (30) at the points, thereby making the wire (30) less possible to be oxidized.

From the above description, it is noted that the invention has the following advantages:

1. Excellent Ground Connection

Because of the slot (228) of the clamp (22), the ground wire (30) is less possible to be oxidized and so the main body (10) may be grounded without the troubles associated with corrosion.

2. Easily Manufactured

Because the screw (20) is configured as standardized one, it is available commercially without the necessity of special manufacture.

3. Convenience in Assembly

Because the clamp (22) is of a convenient configuration, it is easy to be fitted during the assembly of the distributor.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A signal distributor adapted for use with a screw having a flanged neck, comprising:

a main body (10) having a ground outlet (14);

said ground outlet (14) being formed with a threaded hole (16), an orifice (18) laterally extending through said threaded hole (16), and at least one groove (162) axially defined in an inner periphery of said threaded hole (16); and a clamp (22) having a strip (222) deformable to be retained in said flanged neck of said screw, at least one extension (224) extending downwardly from said strip (222) and movable in said at least one groove (162), and a contact (226) connected to respective ends of said at least one extension (224), wherein said contact (226) defines a substantially V-shaped slot (228) in an under face thereof to engage a ground wire (30) retained in said orifice (18).

2. The signal distributor as claimed in claim 1, wherein said ground outlet (14) is formed with two of said grooves (162) axially and diametrically defined in said inner periphery of said threaded hole (16).

3. The signal distributor as claimed in claim 1, wherein said clamp (22) of said ground outlet (14) is formed with two of said extensions (224).

* * * * *